United States Patent [19]
Ritter et al.

[11] 3,849,089
[45] Nov. 19, 1974

[54] PROCESS, SYSTEM AND APPARATUS AND COMPONENTS THEREOF FOR THE SEPARATION OF GASEOUS COMPONENTS

[75] Inventors: Robert A. Ritter; David G. Turnbull, both of Calgary, Canada

[73] Assignee: Ritter Engineering Ltd., Alberta, Canada

[22] Filed: Jan. 4, 1973

[21] Appl. No.: 320,433

[30] Foreign Application Priority Data
Sept. 28, 1972 Canada.............................. 152760

[52] U.S. Cl............................ 55/33, 55/58, 55/179
[51] Int. Cl............................................. B01d 53/04
[58] Field of Search............... 55/33, 58, 62, 74, 75, 55/179, 208, 389

[56] References Cited
UNITED STATES PATENTS

| | | | |
|---|---|---|---|
| 2,075,036 | 3/1937 | Hollis................................... | 55/179 |
| 3,080,219 | 3/1963 | Harvey................................. | 55/21 |
| 3,085,379 | 4/1963 | Kiyonaga et al...................... | 55/58 |
| 3,140,931 | 7/1964 | McRobbie............................. | 55/58 |
| 3,432,995 | 3/1969 | Jaeger et al.......................... | 55/179 |

*Primary Examiner*—Charles N. Hart
*Attorney, Agent, or Firm*—Hubbell, Cohen & Stiefel

[57] ABSTRACT

Improved cyclic process, system and apparatus embodiments, as well as components thereof are provided for separating and recovering a selected gas from a mixture of at least two gases. The improved process includes passing the gas mixture, while under a positive pressure condition of up to about 60 p.s.i.g., through a first adsorption zone containing an adsorbent material which is more selective to one gas than to the selected gas in that gaseous mixture, the adsorption zone also including primary inlet means, and primary outlet means. The gas mixture is caused to travel a relatively long adsorption path from the inlet means, through the adsorbent and out through the primary outlet means. By this means the gas which is more strongly adsorbed is retained in the adsorption zone and the gas which is less strongly adsorbed by the adsorbent is withdrawn from the adsorption zone through the primary outlet zone which is substantially free of adsorbent material. The adsorption step is then discontinued and, while it is so discontinued, adsorbent is regenerated and the more strongly adsorbed gas is removed from the adsorbent by positively urging the adsorbed gases to travel along a relatively short, direct desorbing path to a first distinct zone substantially free of adsorbent disposed within the adsorbent zone, the first distinct zone being subjected to the influence of subatmospheric gaseous pressure, and removing the desorbed gas from the first distinct zone through a secondary outlet zone which is substantially free of adsorbent material. The adsorption-desorption steps are cyclically repeated. In this way the desorbed gas travels a relatively short, direct, desorption path from the adsorbent to the distinct zone and then is removed through a secondary outlet connected to the distinct zone. A system and an apparatus for carrying out such process are also described.

51 Claims, 7 Drawing Figures

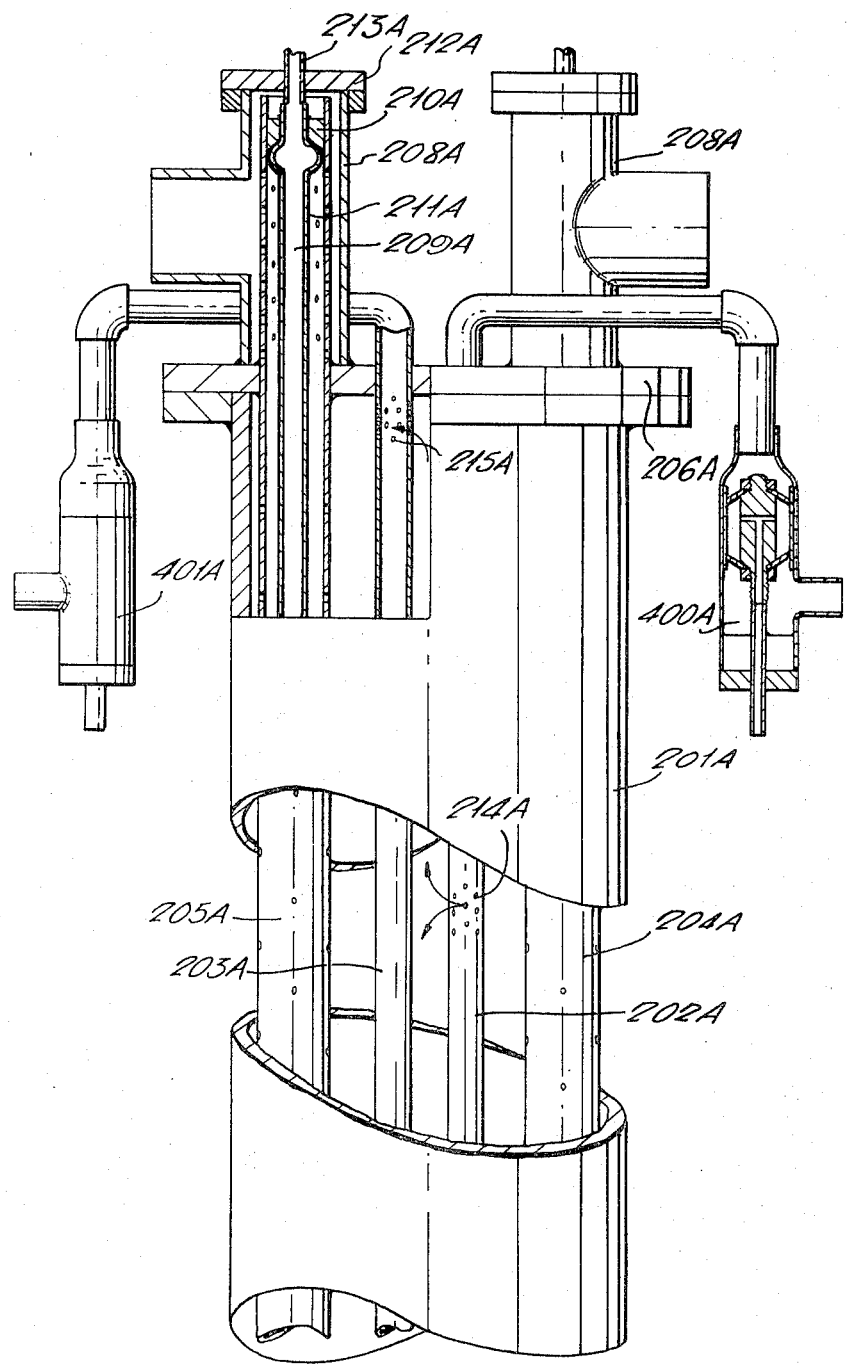

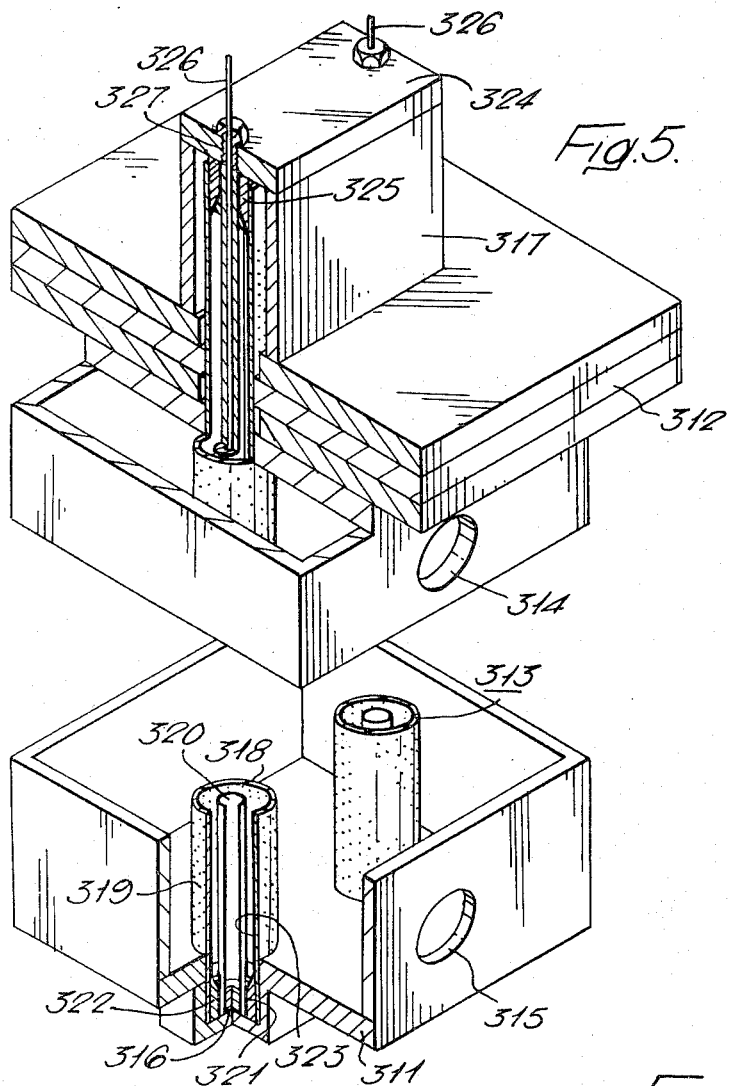
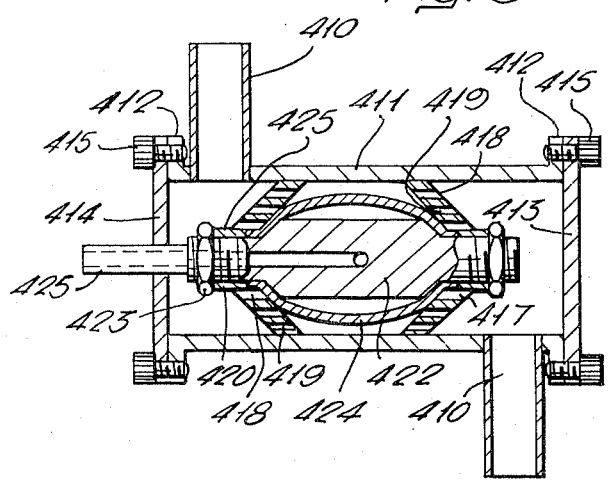

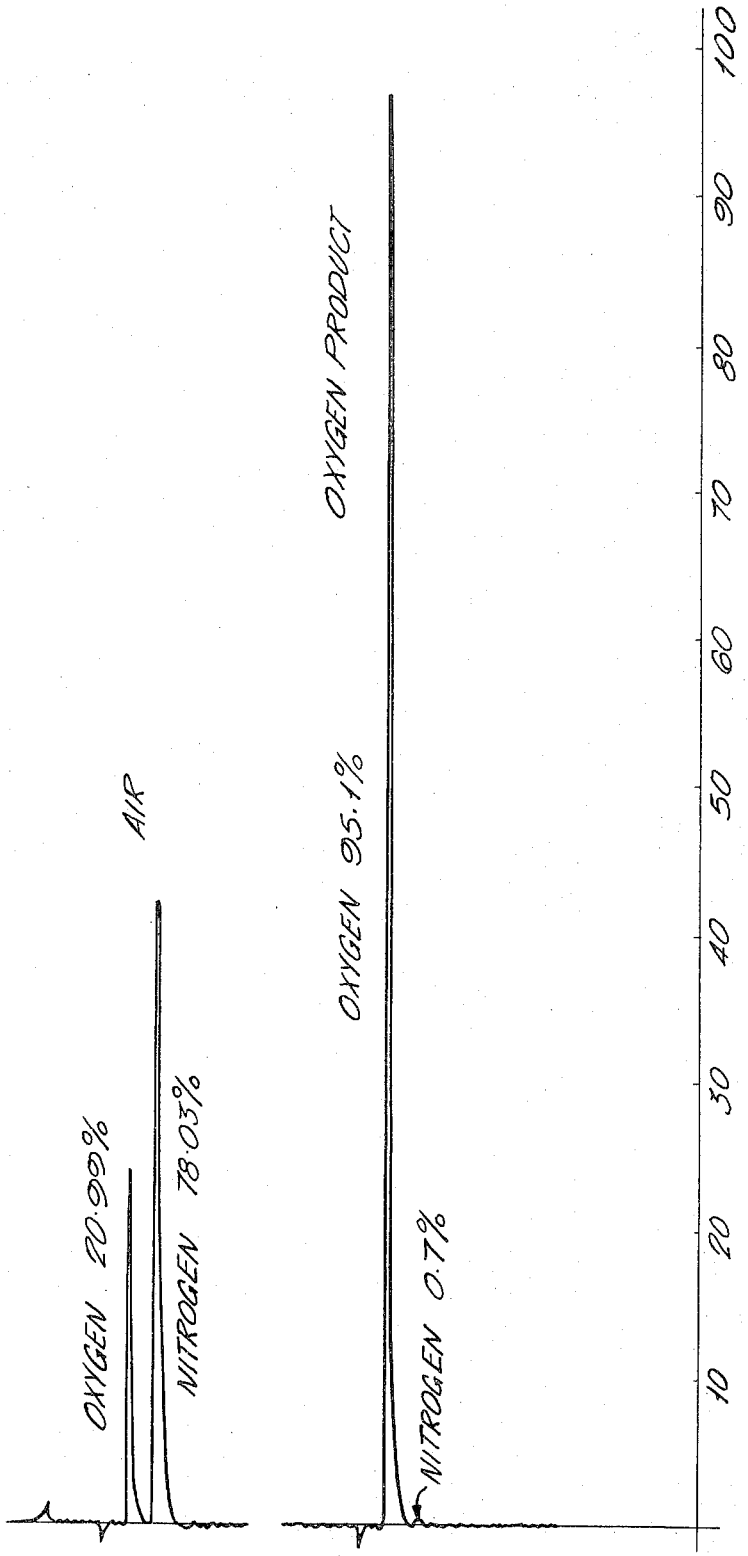

PROCESS, SYSTEM AND APPARATUS AND COMPONENTS THEREOF FOR THE SEPARATION OF GASEOUS COMPONENTS

BACKGROUND OF THE INVENTION

1. Field of the Invention

This invention relates to a process, a system and an apparatus for the separation of a mixture of gases and vapors into its constituent components. One specific adaptation of this invention relates to the separation and recovery of oxygen from air. Another specific adaptation of this invention relates to the separation and recovery of hydrogen from a hydrocarbon gas mixture.

2. Summary of the Prior Art

Many processes, systems and apparatus have been proposed to separate a mixture of gases and vapors into its constituent components. Most involve either complicated procedures or require the use of equipment which is expensive both to assemble and to operate.

In one conventional type of gas-solid or vapor-solid adsorption process, the feed mixture is permitted to enter one end of a packed bed of adsorbent and the desired product is recovered from the opposite end. This process continues for a sufficient period of time, determined by the time when the bed becomes saturated with the more strongly adsorbed components and the product purity begins to deteriorate below acceptable limits. At this point regeneration of the adsorbent is accomplished by reducing the pressure and/or increasing the temperature of the adsorbent and by withdrawing the evolved contaminants from one end or other of the adsorbent bed. The resistance to flow offered by the adsorbent bed over its full length causes the elimination of the contaminants to occur very slowly. The time required for regeneration is often much longer than the time required for adsorption which is usually prohibitively long when a high frequency production-regeneration cycle is desired.

SUMMARY OF THE INVENTION

1. Aims of the Invention

An object of this invention is to provide a simple process, system and apparatus which may be employed in a multitude of situations where the separation, purification, and/or concentration of gaseous mixtures is desired.

Another object of this invention is to provide a process, system and apparatus whereby a gaseous mixture may be separated into a series of effluent product streams, in which at least one such stream is rich in one component portion of the gaseous mixture supplied as a feed material.

Still another object of this invention is to provide a process, system and apparatus whereby oxygen-rich products may be recovered from atmospheric air without the use of liquefaction procedures.

Yet another object of this invention is to provide a' process, system and apparatus whereby one gas, e.g. hydrogen, may be recovered from a natural gas mixture without the need for complicated liquefaction procedures.

A still further object of this invention is to provide such a process, system and apparatus whereby relatively small amounts of adsorbent material are required, and whereby, consequently, expenditures for equipment may be reduced.

2. Statements of the Invention

By this invention, a process is provided for separating a gas from a mixture of at least two gases. The improvement comprises passing the gas mixture, while under a positive pressure condition of up to 60 p.s.i.g., through a first adsorption zone containing an adsorbent material which is more selective to one gas than to another gas in that gaseous mixture, the adsorption zone also including a primary inlet means and a primary outlet means. The gas mixture is thus caused to travel a relatively long adsorption path from the inlet, through the adsorbent and out the primary outlet. By this means the gas which is more strongly adsorbed is retained in the adsorption zone and gas which is less strongly adsorbed by the adsorbent is withdrawn from the adsorption zone through a primary outlet zone which is substantially free of adsorbent material. The adsorbent is then regenerated and the more strongly adsorbed gas is removed from the adsorbent by the application of a subatmospheric pressure to the adsorbent in the adsorption zone through a distinct zone, a secondary outlet zone which is substantially free of adsorbent material. In this way the desorbed gas travels a relatively short, direct desorption path from the adsorbent to the distinct zone which is under subatmospheric pressure and then is removed through a secondary outlet connected to the subpressure distinct zone.

This invention also provides an adsorption-desorption system for selectively separating one gas from a mixture of gases. The system comprises compressor means for subjecting the mixture of gases to superatmospheric pressure. First storage means are provided which are operatively connected to the compressor means for temporarily storing the mixture of gases under pressure. A first pair of adsorption-desorption vessels is provided which is operatively connected to the storage means by gas inlet lines. Each vessel includes an adsorption zone, primary inlet means to the adsorption zone, primary outlet means from the adsorption zone, secondary inlet means to the adsorption zone, secondary outlet means from the adsorption zone, and valve means actuatable selectively to open one only of the primary inlet means and the primary outlet means or the secondary inlet means and the secondary outlet means. Primary gas withdrawal lines are provided leading from the primary outlet means of each vessel of the first pair of adsorption-desorption vessels. Similarly, secondary gas discharge lines are provided leading from the secondary outlet means of each vessel of the first pair of adsorption-desorption vessels to a source of subatmospheric pressure. Finally, control means are provided for cyclically and alternately operating one adsorption-desorption vessel under adsorption conditions, where its primary inlet and outlet are functional while the other such adsorption-desorption vessel is operated under desorption conditions, where its secondary inlet and outlet are functional. This system is preferably hooked-up to another system, which includes second storage means for temporarily storing the gas which has been withdrawn from the first adsorption zone through the primary gas withdrawal lines under subatmospheric pressure. A second pair of adsorption-desorption vessels is provided, which is operatively connected to the second storage means, by gas inlet lines. Each vessel includes an adsorption zone, primary inlet means to the adsorption zone, primary outlet means from the adsorption zone, secondary outlet means from the adsorption zone, and valve means actuatable selectively to open one only of the primary inlet means and the primary outlet means or the secondary outlet means. Primary gas withdrawal lines are provided leading from the primary outlet means of each vessel of the second pair of adsorption-desorption vessels. Similarly, secondary gas discharge lines are provided leading from the secondary outlet means of each vessel of the second pair of adsorption-desorption vessels to an associated secondary inlet means of the first pair of adsorption-desorption vessels. Finally, control means are provided for cyclically and alternately operating one of the second pair of adsorption-desorption vessels under adsorption conditions, where its primary inlet and primary outlet are functional, while the other adsorption-desorption vessel is operated under desorption conditions where its secondary outlet is functional.

This invention also provides an apparatus for separating one gas from at least one other gas in a mixture of gases. The apparatus includes a main chamber which is adapted to contain adsorbent material. The chamber is provided with perforated walls (e.g., rigid perforated tubes) within the chamber and elastomeric diaphragms are associated with the perforated walls or the rigid perforated tubes. A primary inlet means is provided to the chamber and preferably also a secondary inlet means is also provided and alternative primary and secondary outlet means are provided from the main chamber. The primary inlet and outlet means are disposed at intervals throughout the adsorbent bed and are arranged such that the feed gas mixture, in moving from the inlet to the outlet, must travel a relatively long path through the adsorbent bed while the secondary outlet means is interconnected to the perforated walls, i.e., the perforated tube structures. Pressure means are provided which are selectively actuatable to urge the diaphragm into engagement with the perforated wall structure to provide an unperforated combined structure.

In addition, this invention provides an improved diaphragm valve. The valve includes a hollow casing provided with main gas inlet and gas outlet ports. A hollow sleeve is disposed within the casing, this hollow sleeve including gas impermeable sealed ends and a central portion which is gas permeable or perforated or slotted. A pair of perforated members are disposed one at each end of the hollow sleeve member, and these members extend outwardly from the hollow sleeve member to the interior wall of the hollow casing. An elastomeric tubular diaphragm is secured to the ends of the sleeve and envelopes the central zone of the sleeve. The interior of the sleeve communicates to a source of a pressure fluid so that when the fluid is applied, the diaphragm expands to come into sealing engagement with the perforated members so as to provide a combined unperforated member. By these means there can be no gas flow between the gas inlet and gas outlet ports. Releasing the pressure permits gas flow between the inlet and outlet ports.

VARIANTS OF THE INVENTION

In one embodiment of the process of this invention, the process involves separating one dry gas from a mixture of dry gases. The positive urging for regeneration is carried out substantially entirely by a reduction in gaseous pressure within the secondary outlet zone. Such secondary outlet zone is disposed in the first adsorption zone. This provides dry desorbed gas, which is withdrawn through the secondary outlet zone.

In another embodiment of the process of this invention, the process involves drying wet gases. The positive urging for regeneration is carried out by a reduction in gaseous pressure in the secondary outlet zone and by passing dry desorbent gas through the first adsorbent zone via a secondary inlet zone substantially free of adsorbent material. This provides wet desorbent gas, which is withdrawn through the secondary outlet zone.

In yet another embodiment of the process of the invention as described above, the gaseous stream is first compressed, cooled and passed, under a slightly reduced pressure, through an adsorption-desorption system as described above.

In one preferred embodiment, the process includes (I) a drying stage wherein the positive urging for regeneration is carried out by a reduction in gaseous pressure in the secondary outlet zone and by passing dry desorbent gas through the first adsorbent zone via a secondary inlet zone substantially free of adsorbent material. This provides wet desorbent gas, which is withdrawn through the secondary outlet zone. The outlet from the primary outlet zone provides dry feed gas. The dry feed gas is then fed to (II) a separating stage, wherein the positive urging is carried out substantially entirely by a reduction in gaseous pressure within the secondary outlet zone, the secondary outlet zone being disposed in the first adsorption zone. This provides dry desorbed gas, which is withdrawn through the secondary outlet zone.

In one variant of the above-described process, the drying stage (I) is carried out in a pair of cyclically, alternately operated adsorption-regeneration zones, and the separation stage (II) is carried out in a pair of cyclically alternately operated adsorption-regeneration zones. The dry feed gas from the primary outlet zone of each of the adsorption-regeneration zones of the drying stage (I) may be combined and be used as dry feed gas for the separation stage (II). Alternatively, the dry feed gas from the primary outlet zone of one of the adsorption-regeneration zones of the drying stage (I) may be used as dry feed gas for one of the adsorption-regeneration zones for the separation stage (II). The dry feed gas from the primary outlet zone of the other of the adsorption-regeneration zones of the drying stage (I) may then be used as dry feed gas for the other of the adsorption-regeneration zones for the separation stage (II).

In a first preferred embodiment of the above-described process, the primary inlet means and the secondary inlet means are each provided with a valve-controlled aperture means. The valve is operated by fluid under pressure, and the fluid under pressure is a portion of the gas mixture being selectively separated. In another embodiment of the above-described process, the wet feed gas mixture is passed to a first storage zone under positive pressure prior to being dried. In still another embodiment of the above-described process, the dried feed gas mixture is passed to a second storage zone under positive pressure prior to being selectively separated.

In yet another embodiment of the above-described process, the dry selected gas withdrawn via the primary outlet zone of the drying stage is used as dry feed gas in a separation stage. The positive urging for the regeneration is carried out substantially entirely by a reduction in gaseous pressure within the secondary outlet zone, the secondary outlet zone being disposed in the first adsorption zone. This provides dry desorbed gas, which is withdrawn through the secondary outlet zone.

In a still further embodiment of the above-described process, the wet desorbent gas withdrawn via the secondary outlet zone is used as wet feed gas in a process wherein the positive urging for the regeneration is carried out by a reduction in gaseous pressure in the secondary outlet zone and by passing dry desorbent gas through the first adsorbent zone via a secondary inlet zone substantially free of adsorbent material. This provides wet desorbent gas which is withdrawn through the secondary outlet zone.

In another preferred embodiment of the above-described process of this invention, the dry selected gas withdrawn via the primary outlet zone of the separation stage is used as dry feed gas in a second stage separation stage which is carried out as described hereinabove.

In still another embodiment of the above-described process of this invention, the dry desorbent gas fed via the secondary inlet zone is provided by desorbed gas removed through the secondary outlet zone in the separation stage process as described hereinabove.

In yet another embodiment of the above-described process of this invention, the desorbed gas withdrawn via the secondary outlet zone of the separation stage is used as feed gas in a second stage separation process, as described hereinabove.

In one embodiment of the adsorption-desorption system of the invention, the secondary gas discharge lines leading from the secondary outlet means of each vessel of the second pair of adsorption-desorption vessels may merge to combine the gases. The merged line then bifurcates each fork leading to an associated one of the secondary inlet means of the vessels of the first pair of adsorption-desorption vessels. Alternatively, one secondary gas discharge line leading from one secondary outlet means of one vessel of the second pair of adsorption-desorption vessels leads to one of the secondary inlet means of one vessel of the first pair of adsorption-desorption vessels. The secondary gas discharge line leads from the other secondary outlet means of the other vessel of the second pair of adsorption-desorption vessels to the other of the secondary inlet means of the other vessel of the first pair of adsorption-desorption vessels.

In the apparatus for separating one gas from another gas as described above, the vessel includes an upper secondary inlet manifold, an upper secondary outlet manifold, and a vertically disposed adsorption vessel communicating with the upper manifolds. Two perforated tubes extend through the adsorption vessel and terminate one within each manifold. Elastomeric tubular diaphragms are disposed within the perforated tubes and a hollow concentric core is provided within each tubular diaphragm. A port connects the hollow cores to a source of fluid pressure whereby the annuli between the hollow cores and the elastomeric tubular diaphragms may be placed under the influence of a positive pressure to urge the elastomeric tubular diaphragms into perforation-sealing engagement with the perforated tubes. An intermittently perforated primary inlet tube extends through the adsorption vessel and, as well, an intermittently perforated primary outlet tube extends through the adsorption vessel. Two tubular diaphragm valves are used to control flow in the primary inlet and outlet tubes. A control system is provided to permit passage of fluid under pressure in a selected fashion to the elastomeric tubular diaphragms within the perforated tubes during adsorption and to the tubular diaphragm valves connected to the primary inlet and outlet during regeneration/desorption.

The above-described embodiment is generally used as a drier, in which the adsorbent may be regenerated or dried. It is best described as a cyclically operable, cross-flow purgeable, vacuum regeneratable dual path adsorber-desorber. In this embodiment, means are provided for obstructing the perforations in the plates, thereby to provide adsorbent chambers which are sealed columns open only to the primary inlet and outlet means. Means are also provided to release the fluid pressure in the vessel and to establish a vacuum, preferably of 5 inches–0.25 inch mercury absolute pressure in the upper manifold. By releasing the pressure in the elastomeric diaphragm, means are provided to enable a purge or regeneration gas to enter the adsorbent zone, to flow through the adsorbent in a short contact path, carrying desorbed water with it. Means are also provided to draw the purge gas along with its carried water vapor to the upper manifold.

In one embodiment of the adsorption-desorption apparatus of the invention, the adsorption chamber includes an upper inlet port, a lower outlet port, and an upper manifold. A secondary outlet port leads from the upper manifold. A plurality of desorption/regeneration tubes are disposed therewithin, each regeneration tube extending from a dead-end at the bottom of the chamber to the upper manifold above the chamber and including a main perforated outer shell, a tubular elastomeric diaphragm disposed within the tube and secured therewithin both at the dead-end bottom and at the upper manifold, the diaphragm being expandible as far as the perforated outer shell of the regeneration tube. Means are provided for introducing fluid under pressure into the zone interiorly of the expandible tubular diaphragm, such zone communicating with the upper manifold. An outlet port is provided from the upper manifold.

In another preferred embodiment of the invention, each desorption/regeneration tube is a right circular cylinder including a main perforated outer shell, a central concentric hollow core, and a tubular elastomeric diaphragm secured to the hollow core to the bottom at the dead-end and to the top adjacent the upper manifold, the diaphragm being expandible as far as the perforated outer shell of the tube. A tube is provided for the admission of fluid under pressure leading into the hollow core and communicating with an annular zone defined between the hollow core and the expandible tubular diaphragm. The upper manifold communicates with such annular zone.

The above-described embodiment is generally used as a drier in which the adsorbent may be regenerated or dried. It is best described as a cyclically operatable, cross-flow purgeable, vacuum regeneratable dual path adsorber-desorber. In this embodiment, means are provided for obstructing the perforations in the tubes, thereby to provide an adsorbent chamber which is a sealed column open only to the primary inlet and outlet means. Means are also provided to release the fluid pressure in the vessel and to establish a vacuum, preferably of 5 inches – 0.25 inch mercury absolute pressure in the first upper manifold. By releasing the pressure in the elastomeric tubular diaphragms within the perforated tubes, means are provided to enable a purge or regeneration gas to enter the adsorbent zone, to flow through the adsorbent in a short contact path, carrying desorbed water with it. Means are also provided through the adjacent perforated tube to draw the purge gas along with its carried water vapor to the second upper manifold.

In another embodiment of the adsorber-desorber previously described, the adsorption chamber is a generally cylindrical tube or rectangular parallelepiped provided with an inlet port (preferably upper) and an outlet port (preferably lower) and a plurality of desorption or regeneration tubes disposed therewithin. Each regeneration tube extends from a dead-end at the bottom of the chamber to an upper manifold above the chamber and includes a main perforated outer shell and a central concentric hollow core. A tubular elastomer diaphragm is secured to the hollow core, preferably by means of conical clamps, and can expand as far as the perforated outer shell of the regeneration tube. A tube for the admission of fluid under pressure passes into the hollow core and communicates with the annular zone between the hollow core and the expanded tubular diaphragm. The upper manifold is also provided with an outlet port.

In this particular embodiment, the plurality of perforated tubes are located preferably such that the maximum distance to the vessel wall or the adjacent tube is a desired amount. This amount depends on various factors but can vary from less than 2 inches to 3 or more feet. The upper manifold preferably is provided with means to maintain it at an absolute pressure of 0.2 – 0.8 inch Hg. Means are provided to feed high pressure fluid within the diaphragm to seal the perforations in the tubes. The pressure required depends on the elastic modulus of the diaphragm and is generally about 15 to 20 p.s.i. greater than the adsorber pressure.

Means are provided to feed gases through an upper inlet port and to withdraw poorly adsorbed components through the bottom outlet port.

In the diaphragm valve described above, the hollow casing is a right circular cylinder provided with two closed ends, the hollow sleeve is a right circular cylinder concentrically disposed within the hollow casing, and the perforated members are of frusto-conical shape. The fluid introducing means comprises a tube penetrating one closed end of the hollow casing and terminating within the hollow sleeve. Both the inlet port and the outlet port are radially extending; or both the inlet port and the outlet port are axially extending; or one of the inlet or outlet ports is axially extending, and the other is radially extending.

BRIEF DESCRIPTION OF THE DRAWINGS

In the accompanying drawings,

FIG. 4 is a perspective view, partially broken away, of an adsorber-desorber, according to a second embodiment of the present invention;

FIG. 5 is a perspective view, partially broken away, of the upper and lower portions of an adsorber-desorber, according to another embodiment of the present invention;

FIG. 6 is a cross-sectional view of a tubular diaphragm valve according to yet another embodiment of the present invention; and FIG. 7 is a copy of a graph of a chromographic analysis of the product obtained when air is subjected to the process of an aspect of this invention to recover the oxygen therefrom.

DESCRIPTION OF PREFERRED EMBODIMENTS

Figure 1:
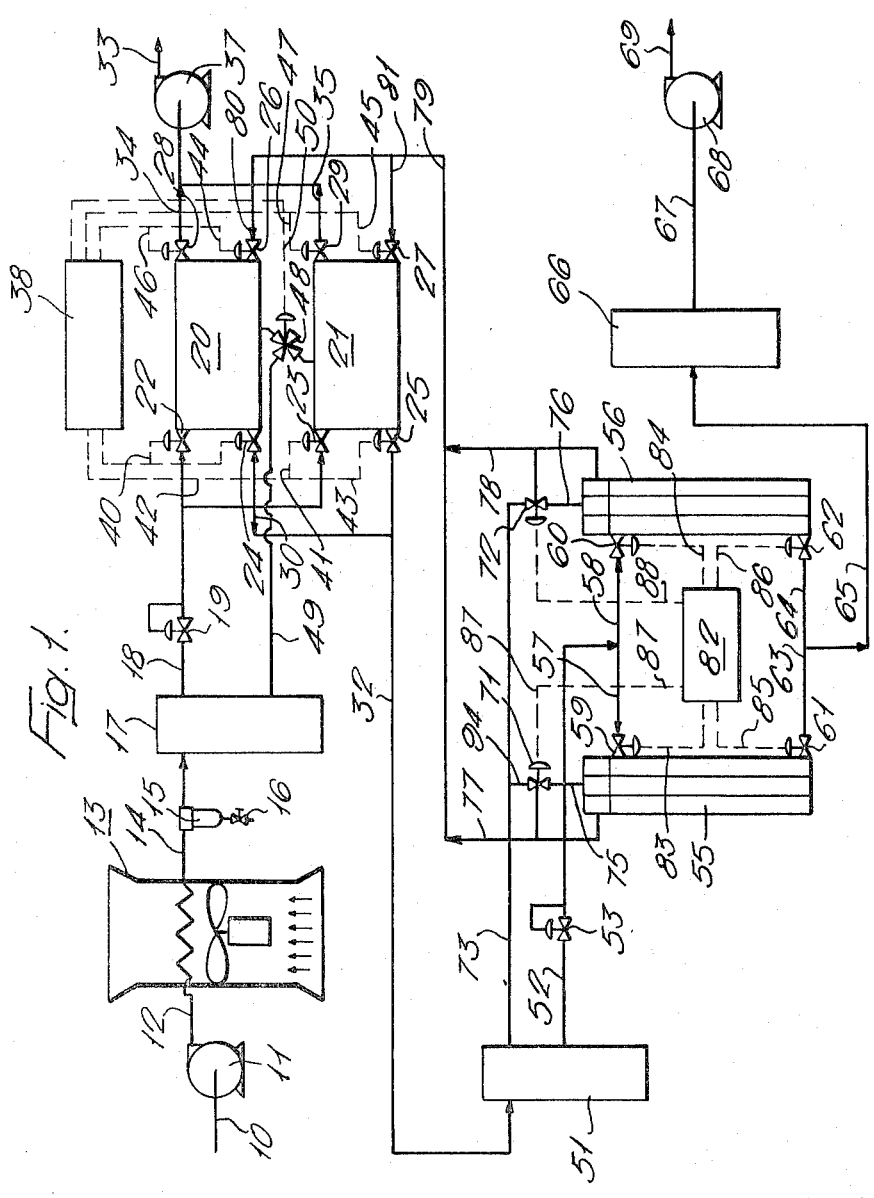
FIG. 1 is a flow diagram of a separation process according to one embodiment of the present invention.

Description of the Embodiment of FIG. 1

Turning now to FIG. 1, the mixture of gases to be separated in line 10 passes first to a compressor 11, where it is compressed to a pressure of from 25 to 60 p.s.i.g., and then through line 12 to a cooler, designated schematically at 13, where the gaseous mixture is cooled to the desired operating temperature. This temperature generally is from 20° to 30°C. The gas is fed, via line 14, through a sump 15 provided with a draw-off valve 16 to a storage tank 17. The gas leaves the storage tank 17 through line 18 and passes through pressure regulator 19, where its pressure is reduced to an appropriate level (generally within the range of 10 to 40 p.s.i.g.) and then to a predetermined one of the cyclically operated adsorption-regeneration type driers 20, 21. Drier 20 is provided with a main inlet having a valve 22 (desirably a tubular diaphragm valve) and a main outlet provided with a valve 24 (desirably a tubular diaphragm valve); similarly drier 21 is provided with a main inlet having a valve 23 (desirably a tubular diaphragm valve), and a main outlet having a valve 25 (desirably a tubular diaphragm valve). Drier 20 is also provided with a purge inlet through manifold 26 and a contaminant (i.e., water) outlet through manifold 28; similarly, drier 21 is provided with a purge inlet through manifold 27 and a contaminant outlet through manifold 29. Gas which has been dried to a dew point of −50°F. or less is withdrawn from drier 20 through valve 24 and line 30, and from drier 21 through valve 25 and line 31, to pass along line 32 to be further processed, as will be hereinafter described. Contaminant gas (e.g., containing water) is removed during the regeneration step from drier 20 along with desorbent gas through manifold 28 and line 34, and from drier 21 through manifold 29 and line 35. Such gas is fed along line 36 to vacuum pump 37 and is discharged or otherwise removed through line 33, as will be described hereinafter.

The operation and sequencing of the driers 20, 21 is effected by control unit indicated generally as 38. Control unit 38 is connected to valves 22, 24, 23, 25, 26, 28, 27, 29 by lines 40, 42, 41, 43, 44, 46, 45 and 47, respectively. As will be further described hereinafter, driers 20, 21 are provided with a perforated wall structure including elastic diaphragms and these are controlled through solenoid valves referred to generally as 48. Fluid under pressure to operate the elastic diaphragms may be obtained from storage tank 17 through line 49, or from independent sources (not shown). Control of the solenoid valves 48 is provided by control unit 38 through line 50.

The dried gaseous mixture as produced hereinabove in the first stage of this process, and which flows in line 32, passes first to a second storage tank 51. Gas is led from tank 51 through line 52 through pressure-reducing valve 53, where the dried feed gas is further reduced from 0 – 30 psig. The gas is fed via line 54 to a predetermined one of two cyclically operated adsorber-desorber units 55, 56 through lines 57, 58, respectively. Adsorber-desorber 55 is provided with an inlet having a valve 59 (desirably a tubular diaphragm valve) and an outlet having a valve 61 (desirably a tubular diaphragm valve); similarly, adsorber-desorber 56 is provided with an inlet having a valve 60 (desirably a tubular diaphragm valve) and an outlet having a valve 62 (desirably a tubular diaphragm valve). Outlet valve 61 leads to line 63 and outlet valve 62 leads to line 64; lines 63 and 64 merge to provide a common outflow line 65 leading to a third temporary storage tank 66 for the gas preferentially separated. Such gas is withdrawn through line 67 and is compressed by pump 68 to its final pressure and withdrawn from the system through line 69.

Each of adsorber-desorber 55, 56 is provided with a solenoid control 71, 72, respectively, and this valve leads gas under pressure (from storage tank 51 through lines 73, 74, respectively) to the elastic diaphragms disposed adjacent the perforated wall structure in the adsorber-desorber 55, 56, via lines 75, 76, respectively. The desorbed dry contaminant gas from adsorber-desorber 55 is withdrawn via line 77; similarly, the desorbed dry contaminant gas from adsorber-desorber 56 is withdrawn via line 78. Lines 77, 78 merge as line 79, which leads to driers 20, 21, via lines 80 and 81, respectively. Such gas is used, as hereinabove described, as the desorbent gas during the regeneration step in the driers.

The operation and sequencing of the adsorbers-desorbers 55, 56 is controlled by control unit designated generally as 82. Valves 59, 61, 60, 62, 71 and 72 are connected to control unit 82 by means of lines 83, 85, 84, 86, 87 and 88, respectively.

Operation of the Embodiment of FIG. 1

In operation, then, of the process described above with reference to FIG. 1, a feed stream of mixed gases or vapors is first compressed to a pressure of from 25 p.s.i.g. to 60 p.s.i.g., is cooled to the desired processing temperature (generally within the range of 20° to 30°C.) and is then placed into storage. The pressure of the feed gas is then reduced to the appropriate level (generally within the range of 10 to 40 p.s.i.g.) and is then dried to a dew point of less than −50°F. in one or other of the two cyclically operating adsorption-regeneration type driers. The dried gas is then again placed into storage. The operation and sequencing of the driers is effected by the control unit.

The pressure of the dried feed gas is further reduced to from 0 psig to 30 psig and such feed gas is then supplied to either of the adsorption/separation units which operate cyclically. Control of the adsorbers is effected by the control unit.

The least strongly adsorbed component of the original feed mixture is recovered from the bottom of the desorber, is temporarily stored and is then compressed to the desired final pressure. Subsequently, at the termination of the adsorption stage of the cycle, the contaminant is withdrawn from the adsorber and may be utilized as dry purge for regeneration of the driers as hereinbefore described. It is then ultimately discharged through the vacuum pump. This stream from the vacuum pump may be discarded as waste. Alternatively, it may be recovered as a more or less impure second product. The vacuum pump effluent, which is enriched in the more strongly adsorbed components of the original feed stream, may be reprocessed through successive stages of the process as described above to attain the desired level of purity of the strongly adsorbed components. The weakly adsorbed product stream from each stage of adsorption may be blended with the weakly adsorbed product from the first stage of separation or, if impure, may be combined with the feed to the first stage. The recovery of ethane and/or ethylene from a mixture with methane provides one example of this application of the process described herein and will be further described hereinafter. The methane is removed as the weakly adsorbed components through successive stages in which the ethane and/or ethylene, together with a decreasing amount of methane, remain on the adsorbent to be removed during regeneration.

The diaphragm valves (desirably tubular diaphragm valves) referred to above as essential components of the adsorber-desorber type driers and the adsorption-separation units may be operated with the aid of compressed process fluid, or alternatively, with inert pressurized fluid from any other source.

Figure 2:
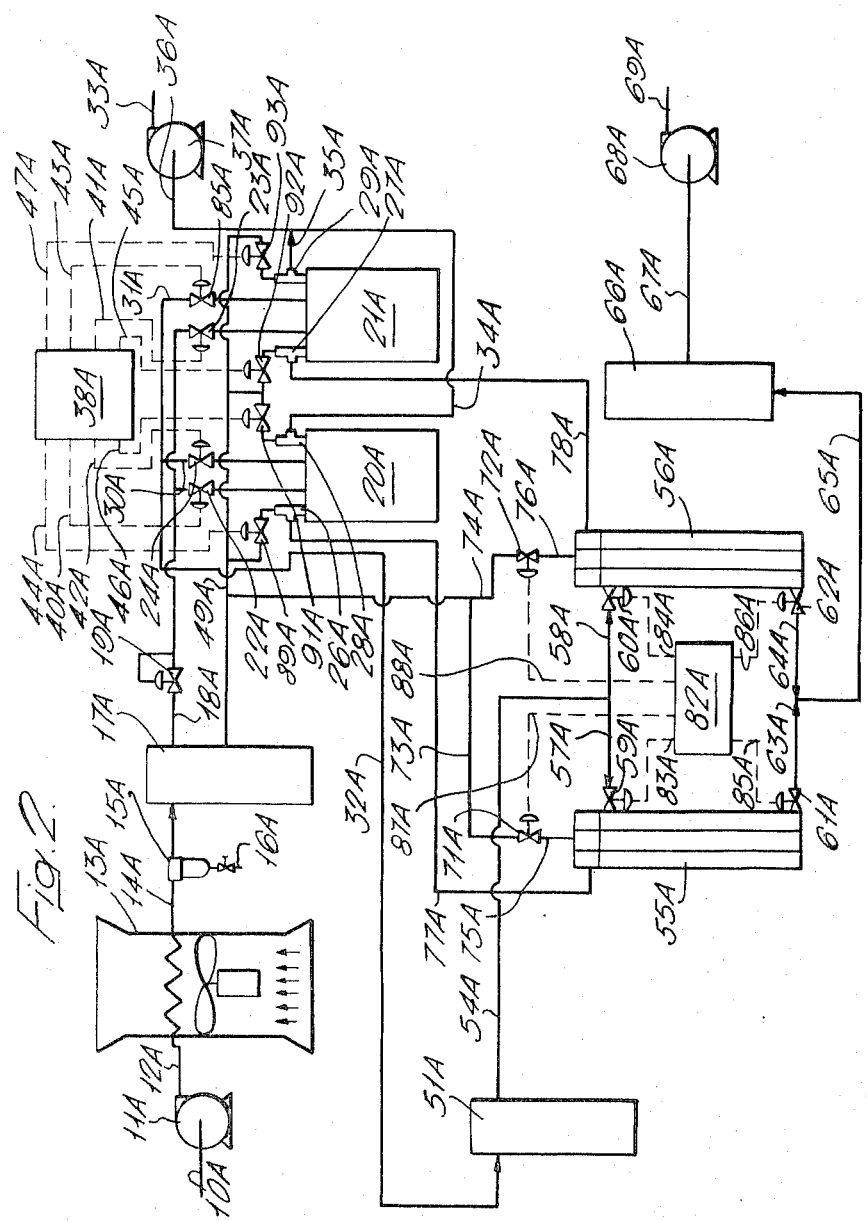
FIG. 2 is a flow diagram of a separation process according to a second embodiment of the present invention.

Description of the Embodiment of FIG. 2

Turning now to FIG. 2, the mixture of gases to be separated in line 10A passes first to a compressor 11A, where it is compressed to a pressure of from 25 to 60 psig, and then through line 12A to a cooler, designated schematically at 13A where the gaseous mixture is cooled to the desired operating temperature. This temperature generally is from 20° to 30°C. The gas is fed, via line 14A, through a sump 15A provided with a draw-off valve 16A to a storage tank 17A. The gas leaves the storage tank 17A through line 18A and passes through pressure-regulator 19A where its pressure is reduced to an appropriate level (generally within the range of 10 to 40 psig) and then to a predetermined one of the cyclically operated adsorption-regeneration type driers 20A, 21A. Drier 20A is provided with a main inlet having a tubular diaphragm valve 22A, and a main outlet provided with a tubular diaphragm valve 24A; similarly drier 21A is provided with a main inlet having a tubular diaphragm valve 23A, and a main outlet having a tubular diaphragm valve 25A. Drier 20A is also provided with a purge inlet through manifold 26A, and a contaminant (i.e., water) outlet through manifold 28A; similarly, drier 21A is provided with a purge inlet manifold 27A and a contaminant outlet manifold 29A. Gas which has been dried to a dew point of −50°F. or less is withdrawn from drier 20A through valve 24A and line 30A, and from drier 21A through valve 25A and line 31A, to pass along line 32A to be further processed, as will be hereinafter described. Contaminant gas (e.g., containing water) is removed during the regeneration step from drier 20A along with desorbent gas through manifold 28A and line 34A and from drier 21A through manifold 29A and line 35A. Such gas is fed along line 36A to vacuum pump 37A and is discharged or otherwise removed through line 33A (and referred to as vacuum pump effluent), as will be described hereinafter.

The operation and sequencing of the driers 20A, 21A is effected by control unit indicating generally as 38A. Control unit 38A is connected to valves 22A, 24A, 23A, 25A, by lines 40A, 42A, 41A, 43A, respectively. As will be further described hereinafter, driers 20A, 21A are provided with perforated tubes equipped with tubular diaphragms and these are controlled through solenoid valves 90A, 91A, 92A, 93A. Fluid under pressure to operate the tubular diaphragm valves may be obtained from storage tank 17A through line 49A, or from independent sources (not shown). Control of the tubular diaphragm valves is provided by control unit 38A through lines 44A, 46A, 45A, 47A.

The dried gaseous mixture as produced hereinabove in the first stage of this process, and which flows in line 32A, passes first to a second storage tank 51A. The gas is fed via line 54A to a predetermined one of two cyclically operated adsorber-desorber units 55A, 56A through lines 57A, 58A, respectively. Adsorber-desorber 55A is provided with an inlet having a tubular diaphragm valve 59A and an outlet having a tubular diaphragm valve 61A; similarly, adsorber-desorber 56A is provided with an inlet having a tubular diaphragm valve 60A and an outlet having a tubular diaphragm valve 62A. Outlet valve 61A leads to line 63A and outlet valve 62A leads to line 64A, lines 63A and 64A merge to provide a common outflow line 65A leading to a third temporary storage tank 66A for the gas preferentially separated. Such gas is withdrawn through line 67A and is compressed by pump 68A to its final pressure and withdrawn from the system through line 69A.

Each of adsorber-desorber 55A, 56A is provided with a solenoid control valve 71A, 72A, respectively, and this valve leads gas under pressure (from storage tank 17A through lines 73A, 74A, respectively) to the tubular diaphragms disposed within the perforated tubes in the adsorber-desorber 55A, 56A via lines 75A, 76A, respectively. The desorbed dry contaminant gas from adsorber-desorber 55A is withdrawn via line 77A; similarly, the desorbed dry contaminant gas from adsorber-desorber 56A is withdrawn via line 78A. Lines 77A, 78A lead to driers 20A, 21A, respectively. Such gas is used, as hereinbefore described, as the desorbent gas for regeneration purposes.

Operation of the Embodiment of FIG. 2

The operation and sequencing of the adsorbers-desorbers 55A, 56A is controlled by control unit designated generally as 82A. Valves 59A, 61A, 60A, 62A, 71A and 72A are connected to control unit 82A by means of lines 83A, 85A, 84A, 86A, 87A and 88A, respectively.

The operation of the process described above with reference to FIG. 2 is the same as described for the process of FIG. 1, with the exception that the pressure of the dried feed gas is not further reduced to from 0 psig to 30 psig prior to being supplied to either of the adsorption/separation units. It will be noted, moreover, that the drier adsorber-desorber units (20A, 21A) are linked to the separator adsorber-desorber units (55A, 56A). Thus, unit 55A is linked, via line 77A to unit 20A; and unit 56A is linked, via line 78A to unit 21A.

Unit 55A may thus provide dry desorbent gas for regeneration of unit 20A, while unit 56A may similarly provide dry desorbent gas for regeneration of unit 21A.

Figure 3:
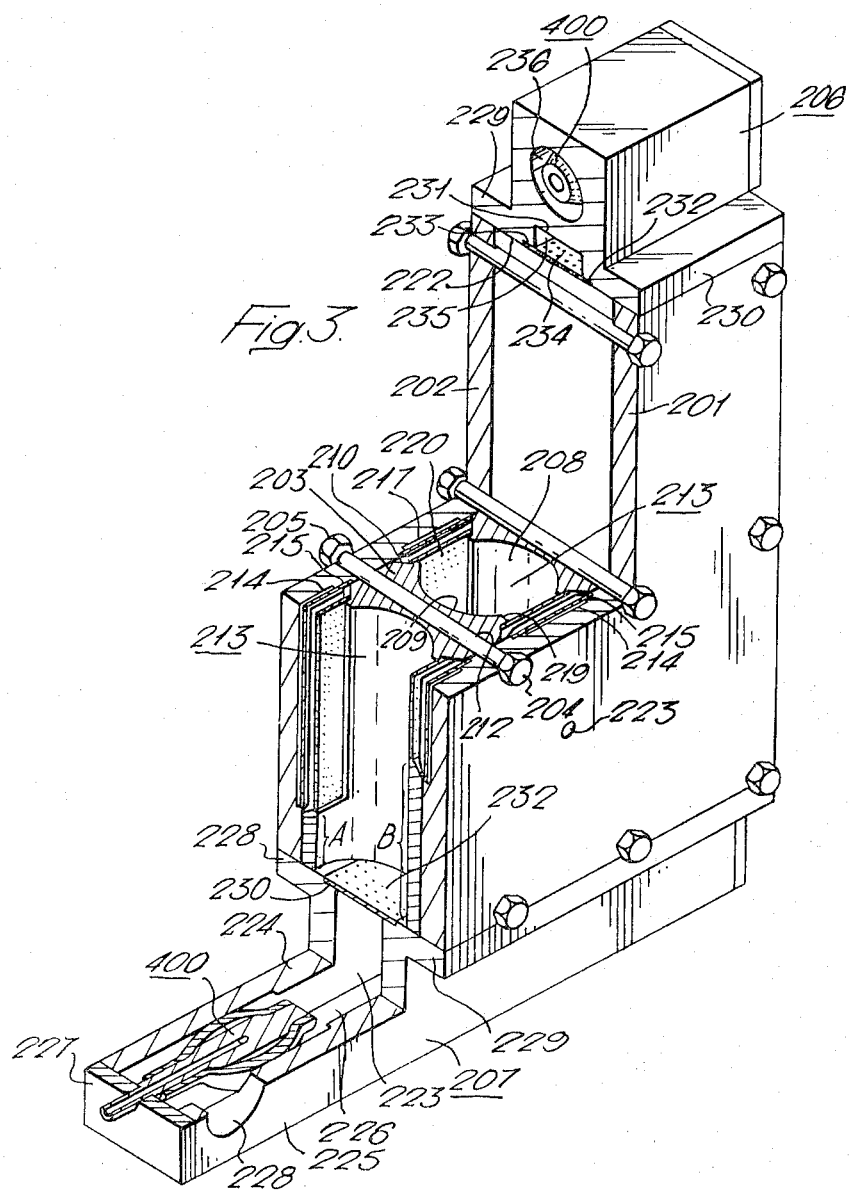
FIG. 3 is a perspective view, partially broken away, of an adsorber-desorber, according to one embodiment of the present invention.

Description of the Embodiment of FIG. 3

Turning now to FIG. 3, there is shown one embodiment of a drier, such as referred to above as 20, 21. It is seen to comprise a generally rectangular parallelpiped vessel with a pair of parallel, spaced apart walls 201, 202 with specially shaped inserts 203 disposed therebetween, and held together by bolt and nut combination 204, 205. The assembly is capped by a generally T-shaped member 206 whose particular structure will be described later, and rests on a generally T-shaped member 207 whose particular structure will also be described later.

Each insert 203 is shaped to provide, in cross-section, a pair of oppositely curved walls 208, 209, a pair of flat walls 210, 211, and a plurality of apertures 212. Walls 210, 211 abut the inside faces of walls 202, 201 respectively, and when the bolt 204 passes through aperture 212 and is held in place by nuts 205, a rigid structure is provided. Also, the generally cylindrical space between facing curved walls 208, 209 provides a plurality of adsorption-desorption chambers 213, even though only two have been shown.

The inside faces of walls 202, 201 at the chambers 213 are provided with primary and secondary vertically extending recesses 214, 215. An outer perforated plate 216 is inserted in the secondary recess 215, and it thereby defines a recessed chamber 217. An elastomeric diaphragm 218 is disposed interiorly of perforated plate 216 and is secured between walls 210, 211 and the inside faces of walls 202, 201, respectively. It is noted that inserts 203 are provided with flanges 219. It is against these flanges that an inner perforated plate 220 is placed. The distance "A" between the bottom 221 of the chamber 213 and the commencement of the perforated plate 220 adjacent wall 202 is relatively small but (while not shown) the perforated plate 220 terminates a considerably greater distance from the top 202. On the other hand, the distance "B" between the bottom 221 of the chamber 213 and the commencement of the perforated plate 220 adjacent wall 201 is relatively great, while (not shown), the perforated plate terminates quite close to the top 202. The functional reason for this will be explained later. Chambers 217 are adapted to be placed under pressure by means of fluid under pressure admitted through port 223. While not shown, it is clear that adjacent chambers 217 are interconnected. Alternatively, a separate port 223 may be provided for each chamber 217.

The bottom of the chamber 213 is provided by the upper portion of the T-shaped member 207. The member 207 includes a pair of spaced-apart walls 224, 225, a bottom 226, end walls 227, and a pair of flanges 228, 229. Flanges 228, 229 are provided with recesses 230, 231, within which is inset a perforated floor plate 232, disposed between the bottom of chamber 213 and the top of a lower manifold 233. The inside side walls 224, 225 are inset at 226, 227 to accommodate components of a tubular diaphragm valve 400, whose complete structure will be described later with respect to FIG. 6. An outlet 238 is provided from the lower manifold 233.

The top 222 of the chamber 213 is provided by flanges 229, 230, on T-shaped member 206. Flanges 229, 230 are provided with a primary recessed portion 231, and an inset portion 232, 233. A perforated ceiling plate 234 is disposed in recesses 232, 233, and so the recess 231 functions as an upper manifold 235. The upper portion of member 206 is provided with a chamber 236 in which a diaphragm valve 400 is disposed, in much the same manner as valve 400 in the lower T-shaped member 207. Chamber 236 communicates with upper manifold 235.

Operation of the Embodiment of FIG. 3

It will be seen, therefore, that the adsorber-desorber type drier may best be described as a cyclically operatable, cross-flow purgeable, vacuum regeneratable, dual path adsorber-desorber which may be utilized for the drying of gases and vapors which range in pressure from near atmospheric upwardly to the mechanical strength limit of the unit. It should be noted that in the final assembly of the unit, each of the plurality of chambers, only two of which are shown, is filled with a suitable adsorbent such as, for example, a selected molecular sieve or silica gel.

During the adsorption stage of the operation of the drier, fluid pressure in excess of the process gas or vapor pressure is applied to the chambers behind the elastomeric diaphragms. As a result, the elastomeric diaphragms expand, and the perforations in the plates are obstructed and the adsorbent chambers are sealed columns which are open only to the primary inlet and outlet at the upper and lower manifolds. Wet gas or vapor is then admitted through the primary inlet upper diaphragm valve, flows through the perforations in the plate, proceeds downwardly through the adsorbent bed and ultimately emerges as a dried product at the open, primary outlet, diaphragm valve.

After an appropriate period of operation, which depends upon the flow rate and water saturation of the feed stream, the adsorbent in the drier is regenerated. To this end, the elastomeric diaphragms are permitted to retract from the perforated plates by releasing the fluid pressure in the chamber. A vacuum ranging from about 25 inches to about 30 inches of mercury is established in the first, upper manifold and dry desorbent gas is permitted to enter the second, lower manifold at a very low flow rate ranging from one to five percent of the drier product flow rate. It should be noted that during operation of the drier in conjunction with the adsorption-separation unit, the dry desorbent gas used in conjunction with the regeneration preferably is provided by the desorbed contaminant from the separation unit. The purge or desorbent gas enters the adsorbent, flows horizontally through the adsorbent and then proceeds through the perforations in the inner plate. As evident from FIG. 4, the unperforated lower region "A" of the adsorbent chamber below the perforated plate is markedly longer than the corresponding region "B" below the perforated inner plate. Furthermore, while not shown, the opposite configuration exists in the upper region of the adsorbent chamber in that the perforated plate does not extend as near to the exit as does the opposite plate. As a result, the purge or desorbent gas fills the annular space between one plate and the diaphragm, then flows across the adsorbent bed thereby carrying the desorbed water vapor through the plate. The stream then moves upwardly between the other plate and the other diaphragm, re-enters the adsorbent bed at the top, then finally exits through the upper manifold. Following an adequate period of regeneration, the unit is again available for drying service. A combination of two such units provides for a continuous flow of dry gas or vapor.

Description of the Embodiment of FIG. 4

Turning now to FIG. 4, there is shown one embodiment of a drier, such as referred to above as 20A, 21A. It is seen to comprise a cylindrical vessel 201A containing an intermittently perforated primary inlet tube 202A and an intermittently perforated primary outlet tube 203A as well as a perforated secondary inlet tube 204A and a perforated secondary outlet tube 205A. All tubes 202A, 203A, 204A and 205A extend the full vertical height of the vessel 201A and are closed at the bottom.

The cylindrical vessel is capped by a flange 206A to which are secured a secondary inlet manifold 207A and a secondary outlet manifold 208A. The perforated secondary inlet and outlet tubes 204A and 205A extend through and form a seal with the flange 206A terminating within the manifolds 207A and 208A respectively.

Disposed concentrically with secondary outlet tube 205A is a hollow core 209A equipped with top and bottom conical clamps 210A. Also disposed concentrically in tube 205A is an elastomeric tubular diaphragm 211A which is secured to and forms a seal with the hollow core 209A by virtue of the conical clamps 210A (lower clamp is not shown).

The upper end of the core 209A is secured to the flange 212A of the manifold 208A. The hollow core 209A is provided with a concentric tube 213A for the admission of fluid under pressure to core 209A and thence to the annular space between core 209A and tubular diaphragm 211A. Thus, tube 213A communicates with core 209A which in turn is in fluid communication with the interior of tube 205A. The interior of tube 204A and manifold 207A is equipped in a fashion identical with that just described in connection with tube 205A and manifold 208A.

Perforated primary inlet and outlet tubes 202A and 203A extend through and form a seal with flange 206A. Connected to the exterior extensions of tubes 202A and 203A are tubular diaphragm valves 400A and 401A. Perforations in the inlet and outlet tubes 202A and 203A are located circumferentially in clusters approximately 24 inches apart and arranged such that the closest spacing between primary inlet tube perforations, such as those indicated at 214A, and primary outlet tube perforations, such as those indicated at 215A, is approximately 12 inches.

Operation of the Embodiment of FIG. 4

It will be seen, therefore, that the adsorber-desorber type drier may best be described as a cyclically operatable, cross-flow purgeable, vacuum regeneratable, dual path adsorber-desorber which may be utilized for the drying of gases and vapors which range in pressure from near atmospheric upwardly to the mechanical strength limit of the unit. It should be noted that the final assembly of the unit is filled with a suitable adsorbent such as, for example, a selected molecular sieve or silica gel.

During the adsorption stage of the operation of the drier, fluid pressure in excess of the process gas or vapor pressure is applied to the core within the tubular elastomeric diaphragms. As a result, the diaphragms expand and the perforations in the tubes are obstructed and the adsorbent chamber is a sealed column which is open only to the primary inlet and outlet tubes. Wet gas or vapor is then admitted through the primary inlet tubular diaphragm valve, flows through the primary inlet tube perforations, proceeds upward and downward through the adsorbent bed, exits from the bed through the primary outlet tube perforations and ultimately emerges as a dried product at the open primary outlet tubular diaphragm valve.

After an appropriate period of operation, which depends upon the flow rate and water saturation of the feed stream, the adsorbent in the drier is regenerated. To this end, the elastomeric diaphragms are permitted to retract from the perforated tubes by releasing the fluid pressure in the hollow core. A vacuum ranging from approximately 5 inches to 0.25 inches of mercury absolute pressure is established in the first manifold and dry desorbent gas is permitted to enter the second manifold at a very low flow rate ranging from 1 to 5 percent of the drier product flow rate. It should be noted that during operation of the drier in conjunction with the adsorption-separation unit, the dry desorbent gas required for regeneration preferably is provided by the desorbed contaminant from the separation unit. The purge or desorbent gas enters the adsorbent through the perforated secondary inlet tube, flows horizontally through the adsorbent then proceeds through the perforations in the diametrically opposed perforated secondary outlet tube. As a result, the purge or desorbent gas fills the annular space between the perforated tube wall and the elastomeric diaphragm in the inlet tube then flows across the adsorbent bed thereby carrying the desorbed water vapor through the perforations in the adjacent tube which is maintained at reduced pressure by means of the upper vacuum manifold. The stream then moves upwardly through the annulus between this tube and the other diaphragm, then finally exits through the upper manifold. Following an adequate period of regeneration, the unit is again available for drying service. A combination of two such units provides for a continuous flow or dry gas or vapor.

Description of the Embodiment of FIG. 5

Turning now to FIG. 5, there is shown one embodiment of an adsorption-desorption type of separation vessel, indicated as 55, 56 in FIG. 1 and 55A, 56A in FIG. 2. As shown, each vessel may be a rectangular parallelepiped 310 provided with a bottom 311 and a top cover 312. Within the vessel 310 is a plurality of regeneration or desorption tubes 313, only two of which are shown. For adsorption operation, an upper gas inlet port 314 and a lower gas outlet port 315 are provided.

Tubes 313 extend the complete vertical height of vessel 310 and one set is a bottom dead-end well 316 and extends through the cover 312 into an upper manifold 317. Each tube 313 is a hollow tube 318 provided with a plurality of circumferential perforations 319 therearound. Disposed concentrically within tube 318 is a hollow core 320 set into a bore 321 and secured to the well 316 by a conical clamp 322. Also disposed concentrically in tube 318 is an elastomeric tubular diaphragm 323, which is secured to and forms a seal with hollow core 320 by virtue of the conical clamp 322.

The upper end of core 320 is secured to the roof 324 of the upper manifold 317. Elastomeric tubular diaphragm 323 is secured to the core 320 by a conical clamp 325. The hollow core 320 is provided with a concentric tube 326 for the admission of fluid and a pressure to core 320 and thence to the annular space between core 320 and tubular diaphragm 323. Thus, tube 326 communicates with core 320 which in turn is in fluid communication with the interior of elastomeric tubular diaphragm 323.

Operation of the Embodiment of FIG. 5

In operation, the vessel is operated under low pressure (generally of the order of 10 to 40 psig) and is filled with appropriate adsorbent. The active section of the adsorber for a variety of separations may be from about 4 to 10 feet in length and should be of sufficient cross-sectional area to accommodate the volume of adsorbent required by the process. Within the vessel, and extending throughout its length, is a series of perforated tubes, which are located such that the maximum horizontal distance to the vessel wall or to the adjacent tube is appropriate to the particular system under consideration. This spacing of tubes will depend upon the regeneration rate desired, the properties of the adsorbate and the adsorbent, and may vary from less than 2 inches to several feet. The tubes extend beyond the top of the adsorption vessel and terminate in a manifold, which is maintained at an absolute pressure of from 0.2 inches of mercury to 0.8 inches of mercury with the aid of a vacuum pump. Centrally located within each tube is a hollow core. The core is enclosed by an elastomeric tubular diaphragm, which is secured and sealed at each end by conical clamps.

The diaphragm may be expanded to seal the perforations in the tube merely by applying a sufficiently high fluid pressure within the diaphragm. The required pressure is dependent upon the thickness and the elastic modulus of the diaphragm and, for those materials investigated, is some 15 – 20 psi in excess of the adsorber pressure. Introduction and removal of this fluid is effected through the tube which, in turn, is interconnected with the hollow central core of the perforated tube assembly.

During the adsorption stage of the operation of this unit, the diaphragms are expanded to seal the perforated tubes, feed gas or vapor is introduced above the adsorbent through the inlet port and the most poorly adsorbed components of the feed mixture are withdrawn as a product at the bottom of the column through the outlet port.

Eventually, the contaminating components in the feed begin to appear in the product stream, thereby indicating that regeneration of the adsorber is necessary. To this end, the feed supply is interrupted and the tubular diaphragms are permitted to contract by releasing the excess pressure on the diaphragms. The contaminants then flow along the short path through the adsorbent bed, through the perforated tubes, up through the annular space between the perforated tube and the contracted tubular diaphragm, and are ultimately withdrawn from the upper manifold by the vacuum pump. Following regeneration, the adsorber is again available for feed separation.

A single vacuum pump can accommodate two adsorption units since proper sequencing will ensure that one unit is undergoing regeneration while the other is in the production stage of operation.

Description of the Embodiment of FIG. 6

Turning now to FIG. 6, there is shown one embodiment of the tubular diaphragm valve indicated at 410 in FIG. 3 and 410A in FIG. 4. The valve 410 (and 410A) includes an open-ended tube 411 provided with flanges 412 to enable end plates 413 and 414 to be secured thereto by bolts 415. Tube 411 is provided with radially extending inlet and/or outlet tubes 416, although it is clear that the tubes may be axially extending and secured to plates 414 or 413, so that they may include one axially extending and one radially extending tube.

Within the central portion of the tube 411 is a pair of conical plugs 417 provided with a plurality of perforations 418 therethrough. The periphery of the base 419 of each plug contacts the interior circumferential surface of the tube 411. The apex 420 of each plug 417 is secured to the closed-ended neck 421 of a double-necked tube 422 by means of nut 423. Disposed around the central, open portion of tube 422 is a tubular elastomeric diaphragm 424 secured at its ends between the outwardly flared end of the central portion of tube 422 and the conical plugs 417. The interior of tube 422 communicates to a source of fluid under pressure through tube 425 which is welded to a central aperture 426 in plate 414 and which passes through closed-ended neck 421.

Operation of the Embodiment of FIG. 6

It is seen, therefore, that the valve consists essentially of two perforated cones, a central drilled core and an elastomeric tubular diaphragm. The latter is secured and sealed by compression between the cones and the core. Communication with the inside of the diaphragm is achieved through a tube which in turn is fastened and sealed to a flange. The valve system is completed by inserting the integral unit described above into the pipe section which is of suitable diameter just to accommodate the cones.

Application of adequate fluid pressure at the tube inlet causes the diaphragm to expand and seal the perforated cones and thereby totally to obstruct the flow of fluid through the pipe section. The pressure within the diaphragm must exceed the pipeline fluid pressure by the amount necessary to maintain the diaphragm in an expanded condition.

It should be noted that a parallel arrangement of several of the diaphragm valve units can be used for the control of fluid flow through pipelines of large diameter.

Examples of the Invention

The following examples are given to illustrate embodiments of the present invention.

EXAMPLE 1

The procedures described herein with reference to FIGS. 1 and 2 were utilized for the recovery of oxygen from air under the following process conditions:

| | |
|---|---|
| Feed Pressure | 30 p.s.i.g. |
| Feed Temperature | 80°F. |
| Adsorber Length | 4 feet |
| Adsorbent | Linde 5A Molecular Sieve |
| Adsorbent Regeneration Time | 1 minute |
| Overall Process Cycle Time | 2 minutes |
| Number of Adsorption Units | 2 |
| Vacuum Pump Size | 25 litres/minute/litre of adsorbent |

The results obtained may be summarized as follows:

| | |
|---|---|
| Production Rate of Oxygen Product | 0.25 litres/minute/litre of adsorbent |
| Product Quality | approximately 95% Oxygen |
| | approximately 4.3% Argon |
| | approximately 0.7% Nitrogen |

Chromatographic analysis of the product which clearly shows the above product quality is shown in FIG. 7.

EXAMPLE 2

The procedure described hereinabove was utilized for the recovery of hydrogen from a gas mixture containing approximately 56 percent hydrogen, 35 percent methane, and lesser amounts of ethane, ethylene, nitrogen, carbon dioxide, and traces of high molecular weight hydrocarbons. The following process conditions were involved:

| | |
|---|---|
| Feed Pressure | 30 psig |
| Feed Temperature | 70°F. |
| Absorber Length | 4 feet |
| Adsorbent | Linde 5A Molecular Sieve |
| Adsorber Regeneration Time | 1 minute |
| Overall Process Cycle Time | 2 minutes |
| Number of Adsorption Units | 2 |
| Vacuum Pump Size | 25 litres/minute/litre of adsorbent |

The results obtained may be summarized as follows:

| | |
|---|---|
| Production Rate of Hydrogen Product | 1.3 litres/minute/litre of adsorbent |
| Product Quality | approximately 98% Hydrogen |
| | approximately 1% Methane |
| | trace amounts of ethane, ethylene, and nitrogen |

It is noted in the description hereinabove that the selected gas to be recovered is the gas which is less easily adsorbed on the adsorbent. This invention is, of course, equally useful where the selected gas to be recovered is the gas which is more easily adsorbed on the adsorbent.

SUMMARY

The present invention thus has provided systems, processes and apparatus components for separating and recovering one selected gas from a mixture of gases.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and "intended" to be, within the full range of equivalence of the following claims.

We claim:

1. A cyclic process for separating and recovering one selected gas from a mixture of at least two gases, which process comprises: preferentially adsorbing one gas from the gas mixture by passing the gas mixture, while under a positive pressure condition of up to 60 p.s.i.g., in a lengthwise direction through an elongated first adsorption zone having a length/width ratio greater than one, said first adsorption zone containing an adsorbent material which is more selective to one gas than to said selected gas in that gaseous mixture, the adsorption zone also including primary inlet means and primary outlet means; causing the gas mixture to travel a relatively long adsorption path along the length of the first adsorption zone from the inlet means, through the adsorbent and out the primary outlet means; withdrawing said selected gas, which is less strongly adsorbed, from said adsorption zone through a primary outlet zone, which is substantially free of adsorbent material; discontinuing the adsorption step; and, while said adsorbing step is discontinued, regenerating the adsorbent by positively urging the adsorbed gases to travel along a relatively short, direct, desorbing path transverse to the adsorption path to a first distinct zone substantially free of adsorbent, disposed within said adsorbent zone, said first distinct zone being disposed along the length of the first adsorption zone, and further being subjected to the influence of a subatmospheric gaseous pressure; removing said desorbed gas from said first distinct zone through a secondary outlet zone which is substantially free of adsorbent material; and cyclically repeating said adsorption-desorption steps.

2. The process of claim 1 which involves separating one dry gas from a mixture of dry gases, wherein said positive urging is carried out substantially entirely by a reduction in gaseous pressure within said secondary outlet zone, said secondary outlet zone being disposed in said first adsorption zone to provide dry desorbed gas; and withdrawing said desorbed gas through said secondary outlet zone.

3. The process of claim 1 which involves drying wet gases, wherein said positive urging is carried out by a reduction in gaseous pressure in said secondary outlet zone and by passing dry desorbent gas through said first adsorbent zone via a secondary inlet zone substantially free of adsorbent material, to provide wet desorbent gas; and withdrawing said wet desorbent gas through said secondary outlet zone.

4. The process of claim 3 wherein said second inlet zone is disposed within said first adsorption zone; wherein said second outlet zone is disposed within said first adsorption zone; and wherein said secondary outlet zone is subjected to said subatmospheric pressure.

5. The process of claim 1 wherein the gas mixture is first compressed, cooled and passed, under a pressure of 25 – 60 p.s.i.g. through said first adsorption zone.

6. The process of claim 3 wherein said selected gas which is less strongly adsorbed is dried to a dew point of less than −50°F.

7. The process of claim 1 wherein the primary inlet means and the secondary inlet means are each provided with a valve-controlled aperture means, said valve being operated by fluid under pressure, said fluid under pressure being a portion of the gas mixture being selectively separated.

8. The process of claim 1 wherein the wet feed gas mixture is passed to a first storage zone under positive pressure prior to being dried.

9. The process of claim 2 wherein the dried feed gas mixture is passed to a second storage zone under positive pressure prior to being selectively separated.

10. The process of claim 1 which includes (I) a drying stage wherein said positive urging is carried out by a reduction in gaseous pressure in said secondary outlet zone and by passing dry desorbent gas through said first adsorbent zone via a secondary inlet zone substantially free of adsorbent material, to provide wet desorbent gas; and withdrawing said wet desorbent gas through said secondary outlet zone, the outlet from the primary outlet zone providing dry feed gas, the dry feed gas then being fed to (II) a separating stage, wherein said positive urging is carried out substantially entirely by a reduction in gaseous pressure within said secondary outlet zone, said secondary outlet zone being disposed in said first adsorption zone to provide dry desorbed gas; and withdrawing said desorbed gas through said secondary outlet zone.

11. The process of claim 3 wherein said dry desorbent gas fed via said secondary inlet zone is provided by desorbed gas removed through the secondary outlet zone in a process wherein said positive urging is carried out substantially entirely by a reduction in gaseous pressure within said secondary outlet zone, said secondary outlet zone being disposed in said first adsorption zone to provide dry desorbed gas; and withdrawing said desorbed gas through said secondary outlet zone.

12. The process of claim 10 wherein the wet desorbent gas withdrawn via the secondary outlet zone is used as wet feed gas in a process wherein said positive urging is carried out by a reduction in gaseous pressure in said secondary outlet zone and by passing dry desorbent gas through said first adsorbent zone via a secondary inlet zone substantially free of adsorbent material, to provide wet desorbent gas; and withdrawing said wet desorbent gas through said secondary outlet zone.

13. The process of claim 1 wherein said dry selected gas withdrawn via said primary outlet zone of said drying stage is used as dry feed gas in a separation stage wherein said positive urging is carried out substantially entirely by a reduction in gaseous pressure within said secondary outlet zone, said secondary outlet zone being disposed in said first adsorption zone to provide dry desorbed gas; and withdrawing said desorbed gas through said secondary outlet zone.

14. The process of claim 13 wherein said dry selected gas withdrawn via said primary outlet zone of said separation stage is used as dry feed gas in a second stage separation stage wherein said positive urging is carried out substantially entirely by a reduction in gaseous pressure within said secondary outlet zone, said secondary outlet zone being disposed in said first adsorption zone to provide dry desorbed gas; and withdrawing said desorbed gas through said secondary outlet zone.

15. The process of claim 10 wherein said drying stage (I) is carried out in a pair of cyclically, alternately operated adsorption-regeneration zones, and wherein said separation step (II) is carried out in a pair of cyclically, alternately operated adsorption-regeneration zones.

16. The process of claim 15 wherein the dry feed gas from the primary outlet zone of each said adsorption-regeneration zones of said drying stage (I) are combined and are used as dry feed gas for said separation stage (II).

17. The process of claim 15 wherein the dry feed gas from the primary outlet zone of one of said adsorption-regeneration zones of said drying stage (I) is used as dry feed gas for one adsorption-regeneration zone for said separation stage (II); and the dry feed gas from the primary outlet zone of the other said adsorption-regeneration zone of said drying stage (I) is used as dry feed gas for the other said adsorption-regeneration zone for said separation stage (II).

18. The process of claim 1 wherein said compressed gases are first cooled to the desired processing temperature.

19. The process of claim 3 wherein said wet desorbent gas withdrawn via the secondary outlet zone of said drying stage is recovered as second product.

20. The process of claim 2 wherein said desorbed gas withdrawn via said secondary outlet zone of said separation stage is used as feed gas in a second stage separation process wherein said positive urging is carried out substantially entirely by a reduction in gaseous pressure within said secondary outlet zone, said secondary outlet zone being disposed in said first adsorption zone to provide dry desorbed gas; and withdrawing said desorbed gas through said secondary outlet zone.

21. The process of claim 2 wherein said selected gas withdrawn via said primary outlet zone of said separation stage is blended with fresh feed gas, and is used in a second stage separation process wherein said positive urging is carried out substantially entirely by a reduction in gaseous pressure within said secondary outlet zone, said secondary outlet zone being disposed in said first adsorption zone to provide dry desorbed gas; and withdrawing said desorbed gas through said secondary outlet zone.

22. An adsorption-desorption system for selectively separating one gas from a mixture of gases which comprises:
1. compressor means for subjecting said mixture of gases to superatmospheric pressure;
2. first storage means operatively connected to said compressor means for temporarily storing said mixture of gases under pressure;
3. a first pair of adsorption-desorption vessels operatively connected to said storage means by gas inlet lines, each said vessel including
   a. an adsorption zone,
   b. primary inlet means to said adsorption zone,
   c. primary outlet means from said adsorption zone,
   d. secondary inlet means to said adsorption zone,
   e. secondary outlet means from said adsorption zone, said secondary outlet means including a first distinct desorption zone disposed within said adsorption zone and providing a plurality of inlet means from said adsorption zone to said first distinct desorption zone, and also providing outlet means from said first distinct desorption zone, and
   f. valve means actuatable selectively to open one set only of said primary inlet means and said primary outlet means whereby said system operates in its adsorption mode or said secondary inlet means and said secondary outlet means, whereby said system operates in its desorption mode;
4. primary gas withdrawal lines leading from said primary outlet means of each vessel of said first pair of adsorption-desorption vessels;
5. secondary gas discharge lines leading from said secondary outlet means of each vessel of said first pair of adsorption-desorption vessels to a source of subatmospheric pressure; and
6. control means for cyclically and alternately operating one of said adsorption-desorption vessels under adsorption conditions, where only its primary inlet and primary outlet are functional, while the other said adsorption-desorption vessel is operated under desorption conditions, where only its secondary inlet and secondary outlet are functional.

23. The system of claim 22 including heat exchanger means disposed between, and operatively connected to, said compressor means and said storage means.

24. The system of claim 22 wherein said subatmospheric pressure at source (5) is generated by a vacuum pump.

25. The system of claim 22 wherein said actuatable valve means (3) (f) comprise valves operated by fluid under pressure.

26. The system of claim 25 wherein said fluid under pressure is bled off from said first storage means.

27. The system of claim 22 including means to reduce the pressure in the line leading between the first temporary storage means and the first pair of adsorption-desorption vessels.

28. The system of claim 22 further including:
7. second storage means for temporarily storing said gas which has been withdrawn from said first adsorption zone through said primary gas withdrawal lines under subatmospheric pressure;
8. a second pair of adsorption-desorption vessels operatively connected to said second storage means, by gas inlet lines, each said vessel including
   a. an adsorption zone,
   b. primary inlet means to said adsorption zone,
   c. primary outlet means from said adsorption zone,
   d. secondary outlet means from said adsorption zone, said secondary outlet means including a first distinct desorption zone disposed within said adsorption zone and providing a plurality of inlet means from said adsorption zone to said first distinct desorption zone, and also providing outlet means from said first distinct desorption zone,
   e. valve means actuatable selectively to open one only of said primary inlet means and said primary outlet means, whereby said second pair of adsorption-desorption vessels operates in its adsorption mode or said secondary outlet means, whereby said second pair of adsorption-desorption vessels operate in its desorption mode;
9. primary gas withdrawal lines leading from said primary outlet means of each vessel of said second pair of adsorption-desorption vessels;
10. secondary gas discharge lines leading from said secondary outlet means of each vessel of said second pair of adsorption-desorption vessels to an associated secondary inlet means of said first pair of adsorption-desorption vessels;
11. control means for cyclically and alternately operating one of said second pair of adsorption-desorption vessels under adsorption conditions, where only its primary inlet and primary outlet are functional, while the other said adsorption-desorption vessel is operated under desorption conditions where only its secondary outlet is functional.

29. The system of claim 28 wherein the secondary gas discharge lines leading from said secondary outlet means of each vessel of said second pair of adsorption-desorption vessels merge, to combine said gases, and said merged line bifurcates then, each fork leading to an associated one of said secondary inlet means of said vessels of said first pair of adsorption-desorption vessels.

30. The system of claim 28 wherein one secondary gas discharge line leading from one said secondary outlet means of one vessel of said second pair of adsorption-desorption vessels leads to one of said secondary inlet means of one vessel of said first pair of adsorption-desorption vessels; and wherein the secondary gas discharge line leading from the other said secondary outlet means of the other vessel of said second pair of adsorption-desorption vessels leads to the other of said secondary inlet means of the other vessel of the first pair of adsorption-desorption vessels.

31. The system of claim 28 including a third temporary storage vessel operatively connected to said primary gas withdrawal lines of said second pair of adsorption-desorption vessels.

32. The system of claim 28 including gas discharge lines from said third temporary storage vessel and gas compressor means connected thereto for compressing gas to be discharged thereby.

33. The system of claim 28 wherein said actuatable valve means (8) (e) comprises valves operated by fluid under pressure.

34. The system of claim 28 wherein said actuatable valve means (8) (e) comprises valves operated by fluid under pressure and wherein said fluid under pressure is bled off from said storage means.

35. The system of claim 28 including means to reduce the pressure in the line leading between the secondary temporary storage means and the second pair of adsorption-desorption vessels.

36. An apparatus for separating one gas from at least one other gas in a mixture of gases, said apparatus comprising: a main chamber which is adapted to contain adsorbent material; primary inlet means to said chamber; primary outlet means from said chamber; secondary outlet means from said chamber; a perforated wall structure within the chamber; an elastomeric diaphragm associated with said perforated wall structure; and means selectively actuatable to urge the diaphragm into engagement with the perforated wall structure to seal the perforations in said wall structure, thereby selectively to make either the primary outlet or the secondary outlet functional.

37. The apparatus of claim 36 including secondary inlet means to said chamber.

38. The apparatus of claim 36 wherein the said adsorption vessels have the cross-sectional shape of a right circular cylinder.

39. An apparatus for separating one gas from at least one other gas in a mixture of gases, said apparatus comprising: a main chamber which is adapted to contain adsorbent material; primary inlet means to said chamber; primary outlet means from said chamber; secondary inlet means to said chamber; secondary outlet means from said chamber; perforated tube structures within the chamber; elastomeric tubular diaphragms associated with said perforated tube structures; and means selectively actuatable to urge the diaphragms into engagement with the perforated tube structures to seal the perforations in said tube structures, thereby selectively to make either the primary inlet and outlet or the secondary inlet and outlet functional.

40. The apparatus of claim 39 including: an upper secondary inlet manifold; an upper secondary outlet manifold; a vertically disposed adsorption vessel communicating with said upper manifolds; two perforated tubes extending through the adsorption vessel and terminating one within each manifold; elastomeric tubular diaphragms disposed within the perforated tubes; a hollow concentric core within each tubular diaphragm; a port connecting the hollow cores to a source of fluid pressure whereby the annuli between the hollow cores and the elastomeric tubular diaphragms may be placed under the influence of a positive pressure to urge the elastomeric tubular diaphragms into perforation-sealing engagement with the perforated tubes; an intermittently perforated primary inlet tube extending through the adsorption vessel; an intermittently perforated primary outlet tube extending through the adsorption vessel; two tubular diaphragm valves to control flow in the primary inlet and outlet tubes; a control system to permit passage of fluid under pressure in a selected fashion to the elastomeric tubular diaphragms within the perforated tubes during adsorption and to the tubular diaphragm valves connected to the primary inlet and outlet during regeneration/desorption.

41. The apparatus of claim 36 in the form of a cyclically operable, cross-flow purgeable, vacuum regeneratable, dual path adsorber/desorber drier, including: means for obstructing the perforations in the tubes, thereby to provide an adsorbent chamber which is a sealed column open only to the perforated primary inlet and outlet tubes; means to release the fluid pressure in the vessel and also to establish a vacuum in the first upper manifold; means to enable a purge or regeneration gas to enter the adsorbent zone from the second upper manifold, to flow through the adsorbent in a short contact path, carrying desorbed water with it; and means to draw the purge gas along with its carried water vapor to the first upper manifold, and for subsequent withdrawal therefrom.

42. The apparatus of claim 39 wherein said adsorption chamber includes an upper inlet port; a lower outlet port; an upper manifold; a secondary outlet port leading from said upper manifold; a plurality of desorption/regeneration tubes disposed therewithin, each regeneration tube extending from a dead-end at the bottom of the chamber to said upper manifold above the chamber and including a main perforated outer shell, a tubular elastomeric diaphragm disposed within said tube and secured therewithin both at said dead-end bottom and at said upper manifold, said diaphragm being expandable as far as the perforated outer shell of the regeneration tube; means for introducing fluid under pressure into the zone interiorly of the expandible tubular diaphragm, said zone communicating with said upper manifold; and an outlet port from said upper manifold.

43. The apparatus of claim 39 wherein said desorption/regeneration tube is a right circular cylinder including a main perforated outer shell, a central concentric hollow core, a tubular elastomeric diaphragm secured to the hollow core to the bottom at said dead-end and to the top adjacent the upper manifold, said diaphragm being expandable as far as the perforated outer shell of the tube, and a tube for the admission of fluid under pressure leading into the hollow core and communicating with an annular zone defined between the hollow core and the expandible tubular diaphragm, said upper manifold communicating with such annular zone.

44. The apparatus of claim 42 wherein the tubular elastomeric diaphragm is secured to the hollow core by means of conical clamps.

45. The apparatus of claim 44 wherein said plurality of perforated tubes is located at a preselected maximum distance to the vessel wall or the adjacent tube; varying from less than 2 inches to 3 or more feet; wherein the upper manifold is provided with means to maintain it at an absolute pressure of 0.2 – 0.8 inch Hg; and wherein means are provided to feed high pressure fluid within the diaphragm to seal the perforations in the tubes, said high pressure fluid being about 15 to 20 p.s.i. greater than the pressure in the adsorbent chamber.

46. An improved diaphragm valve comprising: a hollow casing provided with a gas inlet port and a gas outlet port; a hollow sleeve disposed within said casing, said hollow sleeve including gas impermeable sealed ends and a central gas permeable portion; a pair of perforated members disposed one at each end of said hollow sleeve, each said member extending outwardly from the hollow sleeve member to the interior wall of the hollow casing; an elastomeric tubular diaphragm secured to the ends of said sleeve and enveloping the central, gas permeable zone of the sleeve; means for introducing fluid under pressure into the interior of said sleeve whereby the diaphragm expands to come into sealing engagement with the perforated members to prevent the flow of fluid between the gas inlet and gas outlet ports.

47. The diaphragm valve of claim 46 wherein the hollow casing is a right circular cylinder provided with two closed ends; wherein the hollow sleeve is a right circular cylinder concentrically disposed within the hollow casing; and wherein said perforated members are of frusto-conical shape.

48. The diaphragm valve of claim 47 wherein the fluid introducing means comprises a tube penetrating one closed end of the hollow casing and terminating within the hollow sleeve.

49. The diaphragm valve of claim 47 wherein both the inlet port and the outlet port are radially extending.

50. The diaphragm valve of claim 47 wherein both the inlet port and the outlet port are axially extending.

51. The diaphragm valve of claim 47 wherein one of the inlet or outlet ports is axially extending, and the other is radially extending.

* * * * *